(12) United States Patent
Hung et al.

(10) Patent No.: US 10,439,390 B1
(45) Date of Patent: Oct. 8, 2019

(54) MULTI-PORT POWER SUPPLY APPARATUS AND OPERATION METHOD THEREOF

(71) Applicant: VIA LABS, INC., New Taipei (TW)

(72) Inventors: Nai-Chuan Hung, New Taipei (TW); Hung-Chih Chiu, New Taipei (TW)

(73) Assignee: VIA LABS, INC., New Taipei (TW)

( * ) Notice: Subject to any disclaimer, the term of this patent is extended or adjusted under 35 U.S.C. 154(b) by 0 days.

(21) Appl. No.: 16/103,948

(22) Filed: Aug. 15, 2018

(30) Foreign Application Priority Data

Jul. 27, 2018 (TW) .............................. 107125966 A

(51) Int. Cl.
| | |
|---|---|
| *H02J 1/10* | (2006.01) |
| *H02M 7/15* | (2006.01) |
| *G06F 1/26* | (2006.01) |
| *H02J 3/38* | (2006.01) |

(52) U.S. Cl.
CPC .............. *H02J 1/102* (2013.01); *G06F 1/263* (2013.01); *H02J 3/38* (2013.01); *H02M 7/151* (2013.01)

(58) Field of Classification Search
CPC ........ H02M 7/08; H02M 7/153; H02M 7/151; H02M 3/155–1588; H02J 1/102; H02J 3/38
See application file for complete search history.

(56) References Cited

U.S. PATENT DOCUMENTS

| | | | | |
|---|---|---|---|---|
| 5,926,004 | A * | 7/1999 | Henze .................... | B60L 3/0046 320/109 |
| 6,229,289 | B1 * | 5/2001 | Piovaccari .......... | H02M 3/1588 323/268 |
| 10,008,941 | B1 * | 6/2018 | Radic ................. | H02M 3/33507 |
| 2008/0074095 | A1 * | 3/2008 | Telefus .................... | H02M 1/10 323/282 |
| 2009/0189579 | A1 * | 7/2009 | Melanson ............. | H02J 7/0054 323/282 |
| 2011/0227418 | A1 * | 9/2011 | Pyboyina ................ | H02J 9/062 307/75 |
| 2013/0241808 | A1 * | 9/2013 | Kwon .................... | H02M 3/158 345/76 |
| 2014/0049990 | A1 * | 2/2014 | Limpaecher ............ | H02M 3/24 363/15 |
| 2014/0292236 | A1 * | 10/2014 | Ortiz .................... | H02M 3/1584 318/376 |

(Continued)

Primary Examiner — Yusef A Ahmed
(74) Attorney, Agent, or Firm — JCIPRNET

(57) ABSTRACT

A multi-port power supply apparatus and its operation method are provided. The multi-port power supply apparatus includes a voltage source circuit, a first voltage converter, a second voltage converter and a first common control circuit. The voltage source circuit provides a source voltage. The first voltage converter converts the source voltage into a first output voltage and outputs the first output voltage to a first connecting port of the multi-port power supply apparatus. The second voltage converter converts the source voltage into a second output voltage and outputs the second output voltage to a second connecting port of the multi-port power supply apparatus. The first common control circuit adjusts the source voltage according to a first voltage demand of the first connecting port and a second voltage demand of the second connecting port. Thus, a voltage conversion efficiency of the multi-port power supply apparatus is enhanced.

22 Claims, 8 Drawing Sheets

(56) References Cited

U.S. PATENT DOCUMENTS

| | | | |
|---|---|---|---|
| 2015/0180355 A1* | 6/2015 | Freeman | H02M 1/08 363/21.04 |
| 2015/0244271 A1* | 8/2015 | Lin | H02M 3/33584 363/21.1 |
| 2015/0312983 A1* | 10/2015 | Hu | F21K 9/64 315/186 |
| 2016/0116925 A1* | 4/2016 | Freeman | H02M 3/33546 307/130 |
| 2017/0126146 A1* | 5/2017 | Petersen | H02M 3/158 |
| 2017/0187301 A1* | 6/2017 | Shiau | H02M 1/08 |
| 2017/0201179 A1* | 7/2017 | Yen | H02M 1/42 |
| 2018/0205242 A1* | 7/2018 | Kelly-Morgan | H02J 7/0021 |

* cited by examiner

MULTI-PORT POWER SUPPLY APPARATUS AND OPERATION METHOD THEREOF

CROSS-REFERENCE TO RELATED APPLICATION

This application claims the priority benefit of Taiwan application serial no. 107125966, filed on Jul. 27, 2018. The entirety of the above-mentioned patent application is hereby incorporated by reference herein and made a part of this specification.

BACKGROUND OF THE INVENTION

1. Field of the Invention

The invention relates to a power supply apparatus, and more particularly, to a power supply apparatus having multiple connecting ports and an operation method thereof.

2. Description of Related Art

In general, when the power supply apparatus supplies power to charge an electronic apparatus, the power supply apparatus needs to perform a voltage conversion operation according to a charging specification of the electronic apparatus so an output voltage of the power supply apparatus can satisfy a demanded voltage of the electronic apparatus. The power supply apparatus may include a plurality of connecting ports for supplying power to different electronic apparatuses at the same time. The power supply apparatus has a plurality of voltage converters to respectively provide different output voltages for different connecting ports, and different electronic apparatuses may be respectively connected to these connecting ports to receive these output voltages.

The voltage converters of the power supply apparatus commonly use one fixed source voltage to generate different output voltages separately. A level of the fixed source voltage does not change with changes in voltage demands of the connecting ports. Usually, the level of the fixed source voltage needs to be very high in order to satisfy high voltage demands of the connecting ports. For instance, if the voltage demands of the connecting ports fall within a range of 5V to 20V, the level of the fixed source voltage may be 24V. When the voltage demand of one connecting port is 20V, the voltage converter can convert the fixed source voltage (i.e., 24V) into an output voltage (i.e., 20V). However, when the voltage demand of one connecting port is 5V, the voltage converter needs to pull the voltage from 24V down to 5V. Normally, a voltage conversion efficiency of the voltage converter is lower if the voltage drop is greater. When the voltage converter pulls the voltage from 24V down to 5V, the voltage conversion efficiency of the voltage converter would be reduced such that a part of power not being converted would be lost in form of heat. Consequently, the charger may suffer an overheat condition.

Therefore, it is necessary to provide a new power supply apparatus to solve the problem caused by poor voltage conversion efficiency of the conventional power supply apparatus.

SUMMARY OF THE INVENTION

The invention provides a multi-port power supply apparatus and an operation thereof, which are capable of dynamically adjusting a source voltage provided by a voltages source circuit to enhance the voltage conversion efficiency of the multi-port power supply apparatus.

An embodiment of the invention provides a multi-port power supply apparatus. The multi-port power supply apparatus includes a voltage source circuit, a first voltage converter, a second voltage converter and a first common control circuit. The voltage source circuit provides a source voltage. Each of the first voltage converter and the second voltage converter is coupled to the voltage source circuit to receive the source voltage. The first voltage converter converts the source voltage into a first output voltage and outputs the first output voltage to a first connecting port of the multi-port power supply apparatus. The second voltage converter converts the source voltage into a second output voltage and outputs the second output voltage to a second connecting port of the multi-port power supply apparatus. The first common control circuit is coupled to the first connecting port and the second connecting port to acquire a first voltage demand of the first connecting port and a second voltage demand of the second connecting port. The first common control circuit correspondingly controls the voltage source circuit to dynamically adjust the source voltage according to the first voltage demand and the second voltage demand, so as to enhance the voltage conversion efficiency of the multi-port power supply apparatus.

An embodiment of the invention further provides an operation method of a multi-port power supply apparatus. The operation method of the multi-port power supply apparatus includes: providing a source voltage by a voltage source circuit; converting the source voltage into a first output voltage and outputting the first output voltage to a first connecting port of the multi-port power supply apparatus by a first voltage converter; converting the source voltage into a second output voltage and outputting the second output voltage to a second connecting port of the multi-port power supply apparatus by a second voltage converter; acquiring a first voltage demand of the first connecting port and a second voltage demand of the second connecting port by a first common control circuit; and correspondingly controlling the voltage source circuit to dynamically adjust the source voltage by the first common control circuit according to the first voltage demand and the second voltage demand, so as to enhance a voltage conversion efficiency of the multi-port power supply apparatus.

Based on the above, in the embodiments of the invention, the multi-port power supply apparatus can acquire the first voltage demand of the first connecting port and a second voltage demand of the second connecting port by the first common control circuit. The first common control circuit can dynamically adjust the source voltage provided by the voltage source circuit according to the first voltage demand and the second voltage demand. Thus, the voltage conversion efficiency of the multi-port power supply apparatus may be effectively enhanced.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
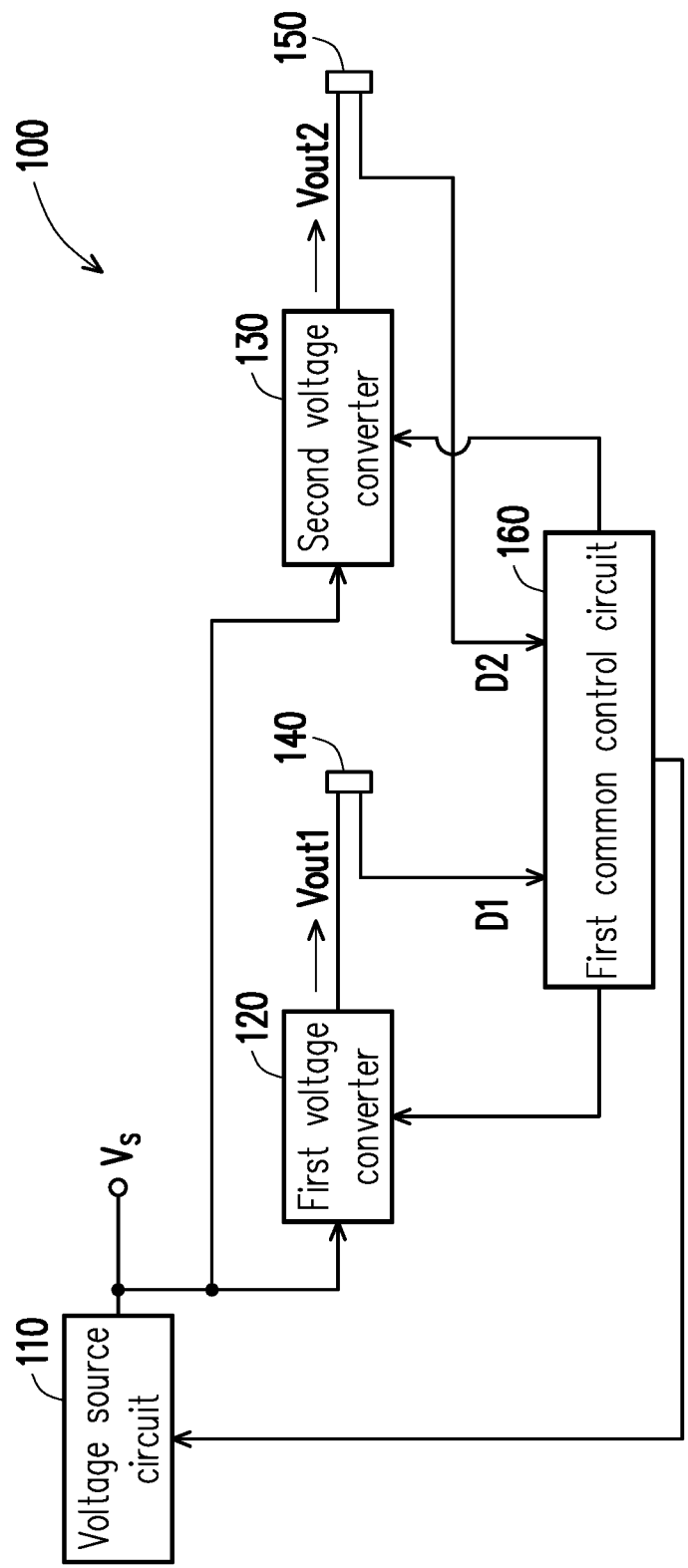
FIG. 1 is a circuit block diagram of a multi-port power supply apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". Moreover, elements/components/steps with same reference numerals represent same or similar parts in the drawings and embodiments. Elements/components/steps with the same reference numerals or names in different embodiments may be cross-referenced.

FIG. 1 is a circuit block diagram of a multi-port power supply apparatus according to an embodiment of the invention. As shown in FIG. 1, a multi-port power supply apparatus 100 includes a voltage source circuit 110, a first voltage converter 120, a second voltage converter 130 and a first common control circuit 160. The multi-port power supply apparatus 100 can supply power to different external electronic apparatuses (not shown) through different connecting ports (e.g., a first connecting port 140 and a second connecting port 150 depicted in FIG. 1). Based on design requirements, the first connecting port 140 and/or the second connecting port 150 may be a universal serial bus (hereinafter, referred to as USB) connecting port or other connecting ports. For instance, the first connecting port 140 and the second connecting port 150 may be a universal serial bus Type-C (USB Type-C, or USB-C) connecting port or a universal serial bus Type-A (USB Type-A) connecting port.

The first common control circuit 160 is coupled to the first connecting port 140 and the second connecting port 150 to acquire a first voltage demand D1 of the first connecting port 140 and a second voltage demand D2 of the second connecting port 150. For instance, in some embodiments, the first common control circuit 160 may be coupled to a configuration channel (hereinafter, referred to as CC) pin of the first connecting port 140. The first common control circuit 160 conducts configuration information transmission with an external electronic apparatus (not shown) through the CC pin of the first connecting port 140 to acquire the voltage demand of the first connecting port 140 (i.e., a voltage demand of the external electronic apparatus). Similarly, the first common control circuit 160 may be coupled to a CC pin of the second connecting port 150 to acquire the voltage demand of the second connecting port 150 (i.e., a voltage demand of another external electronic apparatus). Based on design requirements, the first common control circuit 160 can support various USB protocols so as to satisfy transmission requirements of the first connecting port 140 and the second connecting port 150 with different specifications. For example, when the first connecting port 140 or the second connecting port 150 is the USB Type-C connecting port, the first common control circuit 160 can support a PD (Power Delivery) protocol. When the first connecting port 140 or the second connecting port 150 is the USB Type-A connecting port, the first common control circuit 160 can support a QC (Quick Charge) protocol.

In some other embodiments, the first common control circuit 160 may be coupled to a power pin (a power bus pin, generally marked as Vbus) of the first connecting port 140, to measure a voltage of that power pin (a first output voltage Vout1), which is used as the voltage demand of the first connecting port 140. The first common control circuit 160 may also be coupled a power pin of the second connecting port 150 to measure a voltage of that power pin (a second output voltage Vout2), which is used as the voltage demand of the second connecting port 150.

Based on design requirements, the voltage source circuit 110 may include a voltage regulator or other power supply circuits. The voltage regulator may be a conventional regulator or other voltage regulator circuit/device. A source voltage Vs provided by the voltage source circuit 110 can supply power to the first voltage converter 120 and the second voltage converter 130. Each of the first voltage converter 120 and the second voltage converter 130 is coupled to the voltage source circuit 110 to receive the source voltage Vs. The first voltage converter 120 can convert the source voltage Vs into the first output voltage Vout1 and output the first output voltage Vout1 to the first connecting port 140 of the multi-port power supply apparatus 100. For instance, the first voltage converter 120 can output the first output voltage Vout1 to the power pin (the power bus pin) of the first connecting port 140. The second voltage converter 130 can convert the source voltage Vs into the second output voltage Vout2 and outputs the second output voltage Vout2 to the second connecting port 150 of the multi-port power supply apparatus 100. For instance, the second voltage converter 130 can output the second output voltage Vout2 to the power pin (the power bus pin) of the second connecting port 150.

The first common control circuit 160 can control the first voltage converter 120 according to the first voltage demand D1 of the first connecting port 140, so as to adjust the first output voltage Vout1. The first common control circuit 160 can also control the second voltage converter 130 according to the second voltage demand D2 of the second connecting port 150, so as to adjust the second output voltage Vout2. In this way, the multi-port power supply apparatus 100 can dynamically adjust the first output voltage Vout1 of the first connecting port 140 to satisfy the voltage demand of the first connecting port 140, and the multi-port power supply apparatus 100 can dynamically adjust the second output voltage Vout2 of the second connecting port 150 to satisfy the voltage demand of the second connecting port 150. Based on design requirements, the first voltage converter 120 and/or the second voltage converter 130 may be a boost converter, a buck converter, a boost-buck converter or other voltage conversion circuits/devices.

The first common control circuit 160 can also correspondingly control the voltage source circuit 110 according to the first voltage demand D1 and the second voltage demand D2, so as to dynamically adjust the source voltage Vs, so as to enhance the voltage conversion efficiency of the multi-port power supply apparatus 100. In the case where each of the first voltage converter 120 and the second voltage converter 130 is the buck converter, the first common control circuit 160 can dynamically adjust the source voltage Vs to make the source voltage Vs close to a greatest one of the first output voltage Vout1 and the second output voltage Vout2. For instance, it is assumed that the first voltage demand D1 of the first connecting port 140 indicates that the first output voltage Vout1 should be 20V, and the second voltage demand D2 of the second connecting port 150 indicates that the second output voltage Vout2 should be 5V. In this case, the first common control circuit 160 can control the voltage source circuit 110 to adjust the source voltage Vs to be a voltage close to the first output voltage Vout1 (i.e., 20V). For example, the source voltage Vs may be adjusted to 24V. Further, it is assumed that the first voltage demand D1 of the first connecting port 140 indicates that the first output voltage Vout1 should be 5V, and the second voltage demand D2 of the second connecting port 150 indicates that the second output voltage Vout2 should be 12V. In this case, the first common control circuit 160 can control the voltage source circuit 110 to adjust the source voltage Vs to be a voltage close to the second output voltage Vout2 (i.e., 12V). For example, the source voltage Vs may be adjusted to 15V. Furthermore, it is assumed that the first voltage demand D1 of the first connecting port 140 indicates that the first output voltage Vout1 should be 5V, and the second voltage demand D2 of the second connecting port 150 indicates that the second output voltage Vout2 should be 5V. In this case, the first common control circuit 160 can control the voltage source circuit 110 to adjust the source voltage Vs to be a voltage close to both the first output voltage Vout1 (i.e., 5V) and the second output voltage Vout2 (i.e., 5V). For example, the source voltage Vs may be adjusted to 7V. The first common control circuit 160 can make the source voltage Vs as close as possible to the greatest one of the first output voltage Vout1 and the second output voltage Vout2 to reduce power conversion loss of the voltage converter to thereby enhance the voltage conversion efficiency of the multi-port power supply apparatus 100.

Figure 2:
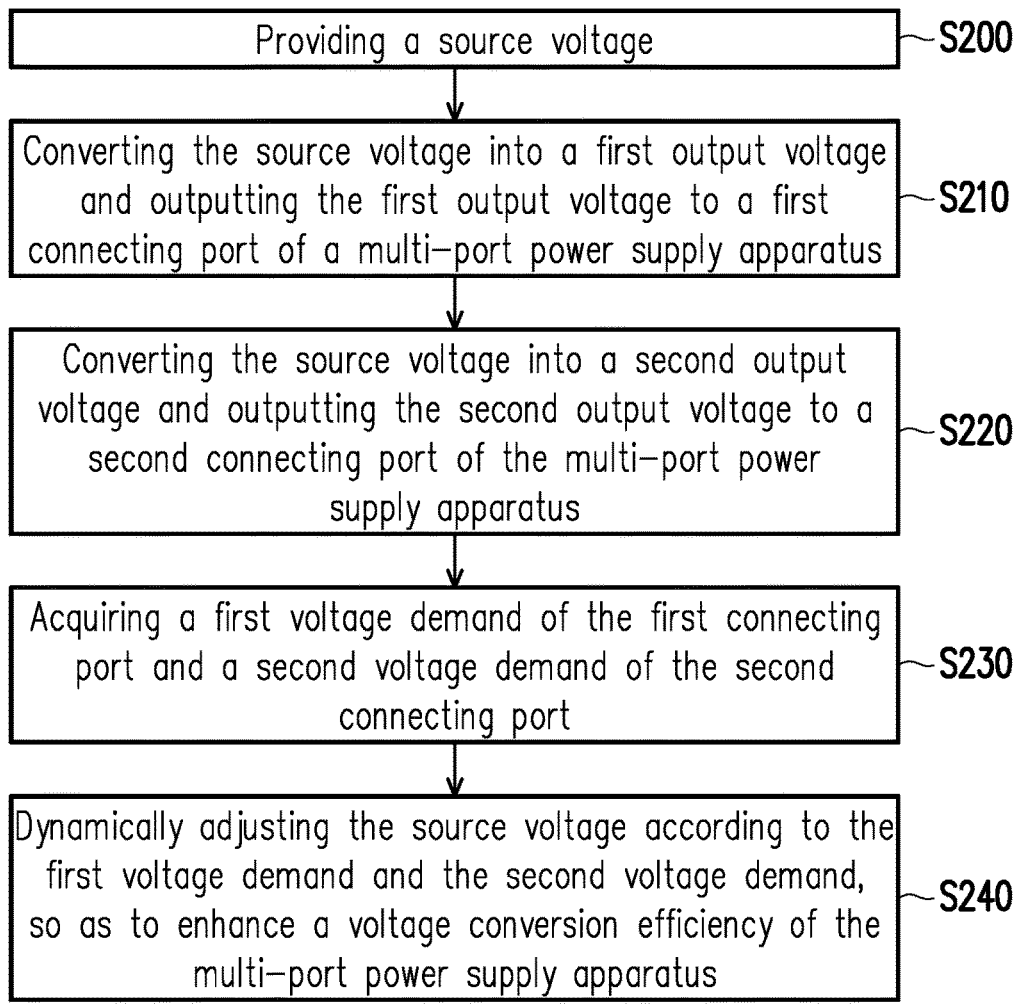
FIG. 2 is a flowchart illustrating an operation method of the multi-port power supply apparatus according to an embodiment of the invention.

FIG. 2 is a flowchart illustrating an operation method of the multi-port power supply apparatus 100 according to an embodiment of the invention. With reference to FIG. 1 and FIG. 2, in step S200, the voltage source circuit 110 can provide the source voltage Vs to each of the first voltage converter 120 and the second voltage converter 130. The first voltage converter 120 can convert the source voltage Vs into the first output voltage Vout1 and output the first output voltage Vout1 to the first connecting port 140 of the multi-port power supply apparatus 100 in step S210. The second voltage converter 150 can convert the source voltage Vs into the second output voltage Vout2 and output the second output voltage Vout2 to the second connecting port 150 of the multi-port power supply apparatus 100 in step S220.

In step S230, the first common control circuit 160 can detect the voltage demands of the first connecting port 140 and the second connecting port 150 to acquire the first voltage demand D1 of the first connecting port 140 and the second voltage demand D2 of the second connecting port 150. In step S240, the first common control circuit 160 can correspondingly control the voltage source circuit 110 to dynamically adjust the source voltage Vs according to the first voltage demand D1 and the second voltage demand D2, so as to enhance the voltage conversion efficiency of the multi-port power supply apparatus 100.

Figure 3A:
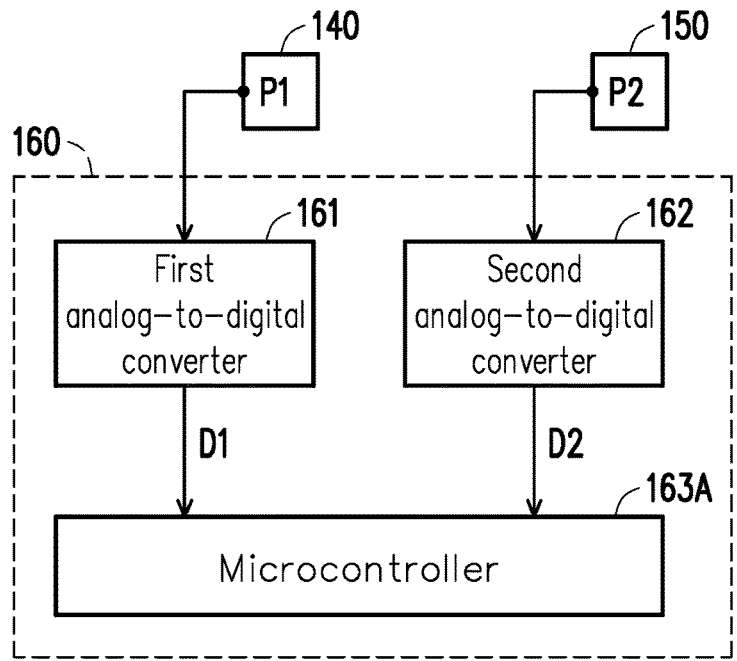
FIG. 3A and FIG. 3B are circuit block diagrams illustrating the first common control circuit of FIG. 1 according to different embodiments of the invention.
Figure 3B:
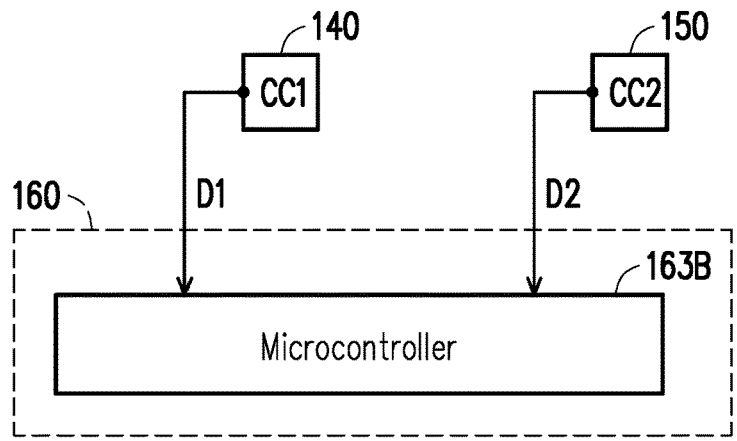

FIG. 3A and FIG. 3B are circuit block diagrams illustrating the first common control circuit 160 of FIG. 1 according to different embodiments of the invention. As shown in FIG. 3A, the first common control circuit 160 includes a first analog-to-digital converter 161, a second analog-to-digital converter 162 and a microcontroller 163A. An input terminal of the first analog-to-digital converter 161 is coupled to a power pin P1 (the power bus pin) of the first connecting port 140. An input terminal of the second analog-to-digital converter 162 is coupled to a power pin P2 (the power bus pin) of the second connecting port 150. The first analog-to-digital converter 161 can convert an analog voltage of the power pin P1 of the first connecting port 140 into digital data to be used as the first voltage demand D1. The first analog-to-digital converter 162 can also convert an analog voltage of the power pin P2 of the second connecting port 150 into digital data to be used as the second voltage demand D2.

The microcontroller 163A is coupled to the first analog-to-digital converter 161 and the second analog-to-digital converter 162 to receive the first voltage demand D1 and the second voltage demand D2. The microcontroller 163A controls the voltage source circuit 110 to dynamically adjust the source voltage Vs according to the first voltage demand D1 and the second voltage demand D2. Accordingly, by detecting the voltages of the power pins P1 and P2, the first common control circuit 160 can acquire the first voltage demand D1 of the first connecting port 140 and the second voltage demand D2 of the second connecting port 150, so as to dynamically adjust the source voltage Vs according to the first voltage demand D1 and the second voltage demand D2.

In the embodiment of FIG. 3B, the first common control circuit 160 can acquire the first voltage demand D1 and the second voltage demand D2 by detecting a CC pin CC1 of the first connecting port 140 and a CC pin CC2 of the second connecting port 150. For instance, as shown in FIG. 3B, the first common control circuit 160 includes a microcontroller 163B. The microcontroller 163B is coupled to the CC pin CC1 of the first connecting port 140 and the CC pin CC2 of the second connecting port 150 to respectively receive the first voltage demand D1 and the second voltage demand D2. In this way, the microcontroller 163B can then correspondingly control the voltage source circuit 110 according to the first voltage demand D1 and the second voltage demand D2, so as to dynamically adjust the source voltage Vs.

Figure 4A:
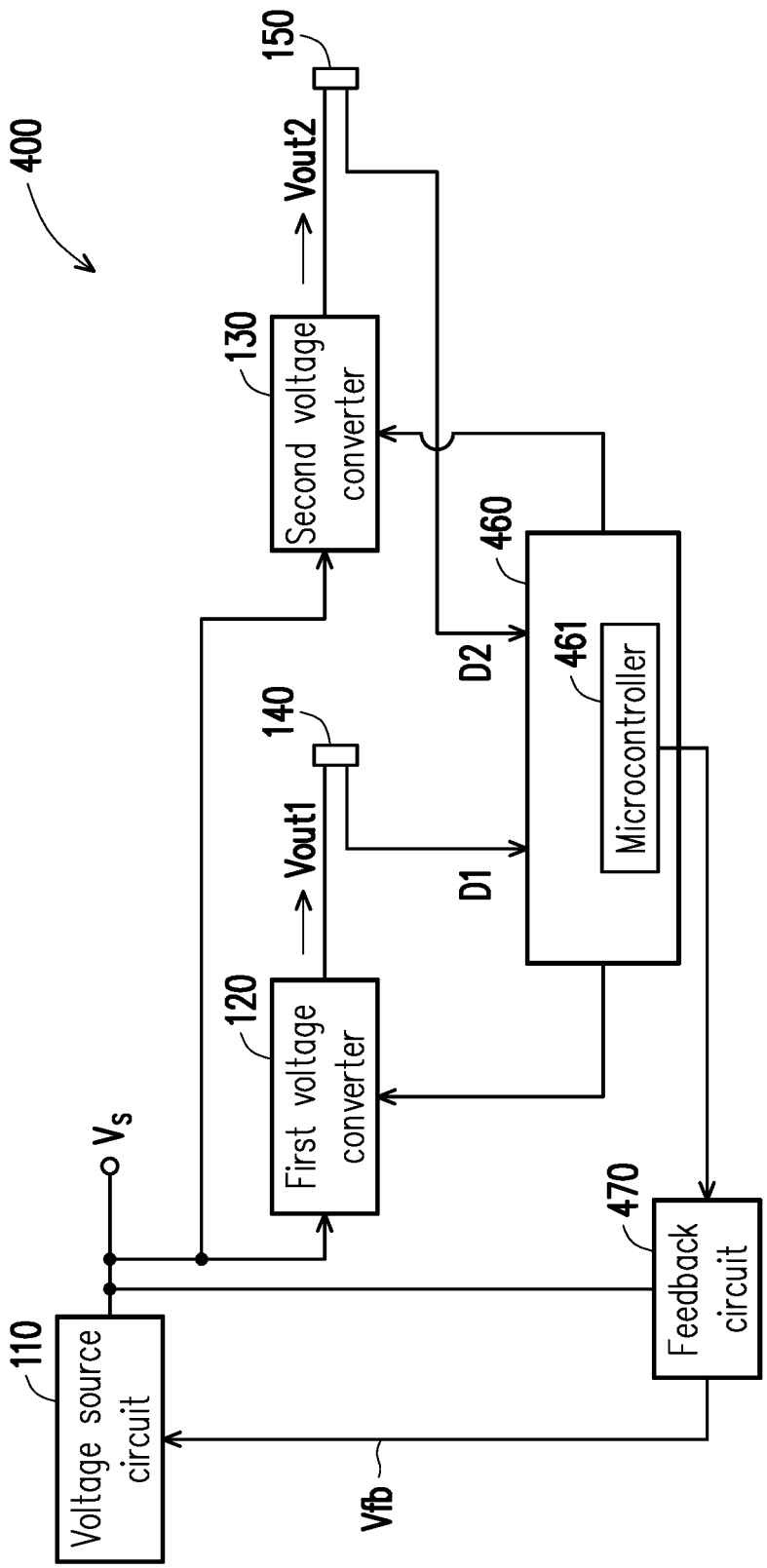
FIG. 4A is a circuit block diagram of a multi-port power supply apparatus according to another embodiment of the invention.

FIG. 4A is a circuit block diagram of a multi-port power supply apparatus 400 according to another embodiment of the invention. The multi-port power supply apparatus 400 of FIG. 4A includes the source voltage circuit 110, the first voltage converter 120, the second voltage converter 130, a first common control circuit 460 and a feedback circuit 470. In the embodiment depicted in FIG. 4A, the first common control circuit 460 is disposed with a microcontroller 461. The voltage source circuit 110, the first voltage converter 120, the second voltage converter 130 and the first common control circuit 460 depicted in FIG. 4A may refer to related descriptions for the voltage source circuit 110, the first voltage converter 120, the second voltage converter 130 and the first common control circuit 160 depicted in FIG. 1, which are not repeated hereinafter.

In the embodiment of FIG. 4A, the microcontroller 461 of the first common control circuit 460 is coupled to the feedback circuit 470 of the voltage source circuit 110. The microcontroller 461 can control a divider ratio of the feedback circuit 470 according to the first voltage demand D1 and the second voltage demand D2. The feedback circuit 470 can convert the source voltage Vs into feedback information Vfb according to the divider ratio. The voltage source circuit 110 can dynamically adjust the source voltage Vs according to the feedback information Vfb.

Figure 4B:
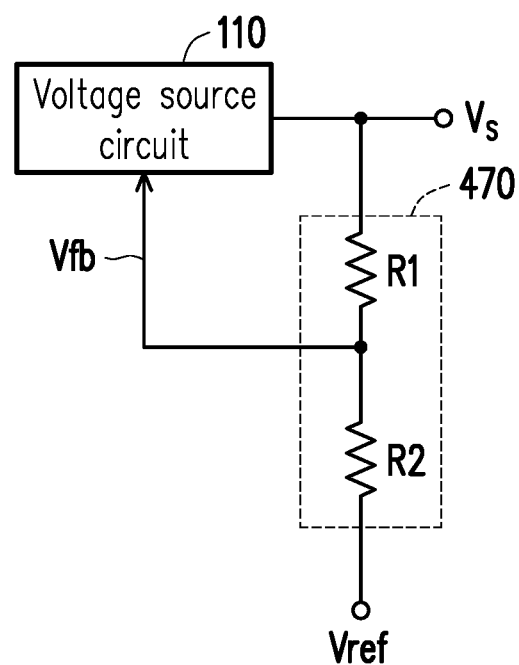
FIG. 4B is a circuit schematic diagram illustrating the feedback circuit of FIG. 4A according to an embodiment of the invention.

For instance, FIG. 4B is a circuit schematic diagram illustrating the feedback circuit 470 of FIG. 4A according to an embodiment of the invention. As shown in FIG. 4B, the feedback circuit 470 of the voltage source circuit 110 includes a first resistor R1 and a second resistor R2. A first terminal of the first resistor R1 is coupled to an output terminal of the voltage source circuit 110 to receive the source voltage Vs. A second terminal of the first resistor R1 is coupled to a feedback terminal of the voltage source circuit 110 to provide the feedback information Vfb. A first terminal of the second transistor R2 is coupled to the second terminal of the first resistor R1. A second terminal of the second resistor R2 is coupled to a reference voltage Vref. A level of the reference voltage Vref may be determined based on design requirements. For instance, the reference voltage Vref may be a ground voltage or other fixed voltages. Because the multi-port power supply apparatus 400 of FIG. 4A is disposed with the feedback circuit 470, the microcontroller 461 can change the feedback information Vfb by changing a resistance of at least one of the first resistor R1 and the second resistor R2 (i.e., changing the divider ratio of the feedback circuit 470). Once the feedback information Vfb is changed, the source voltage Vs would be changed correspondingly. That is to say, the voltage source circuit 110 can provide the source voltage Vs in different voltage levels according to the feedback information Vfb.

Figure 5A:
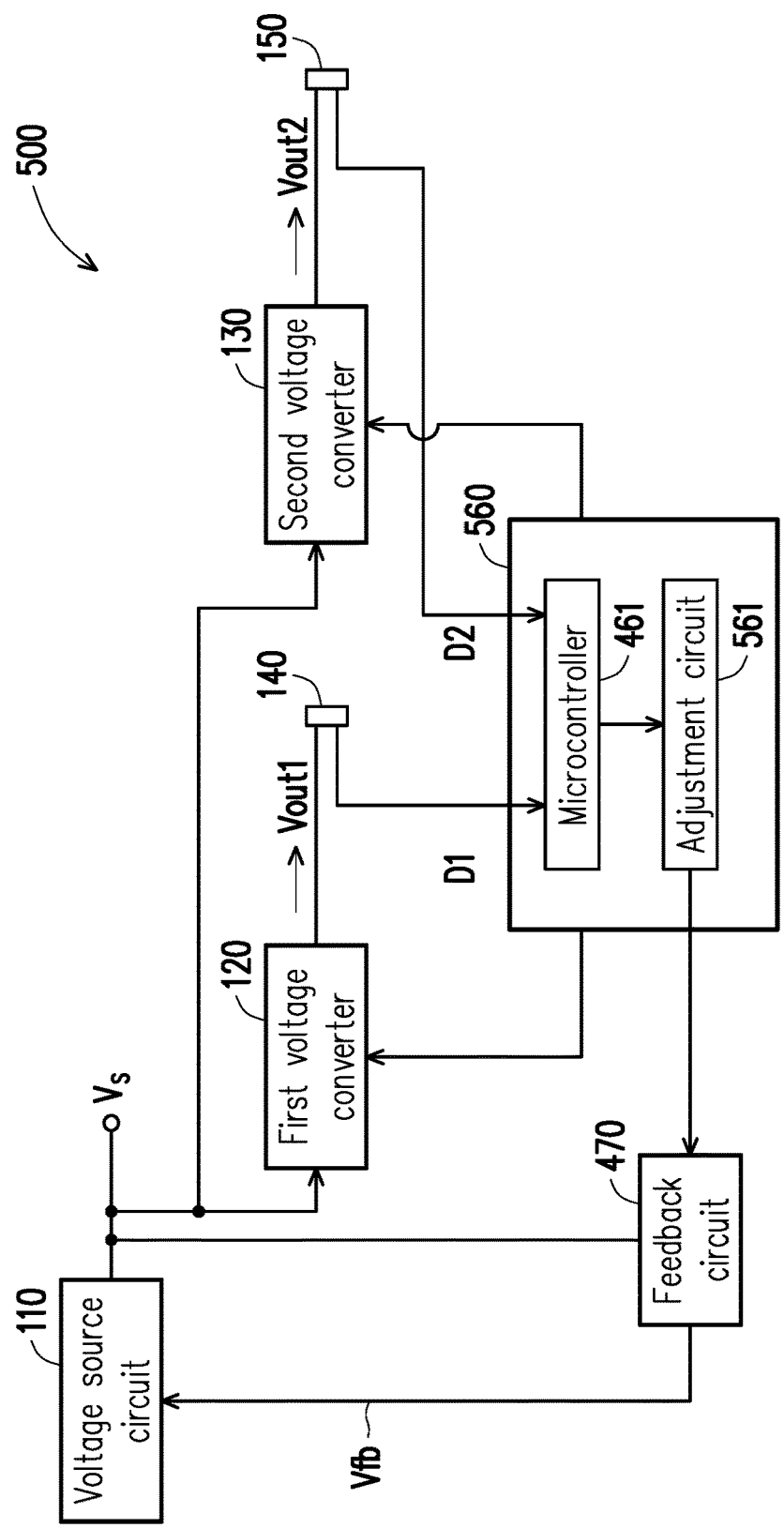
FIG. 5A is a circuit block diagram of a multi-port power supply apparatus according to yet another embodiment of the invention.

FIG. 5A is a circuit block diagram of a multi-port power supply apparatus 500 according to yet another embodiment of the invention. The multi-port power supply apparatus 500 of FIG. 5A includes the source voltage circuit 110, the first voltage converter 120, the second voltage converter 130, a first common control circuit 560 and the feedback circuit 470. The voltage source circuit 110, the first voltage converter 120, the second voltage converter 130 and the first common control circuit 560 depicted in FIG. 5A may refer to related descriptions for the voltage source circuit 110, the first voltage converter 120, the second voltage converter 130 and the first common control circuit 160 depicted in FIG. 1 and the feedback circuit 470 and the first common control circuit 560 depicted in FIG. 5A may refer to related descriptions for the feedback circuit 470 and the first common control circuit 460 depicted in FIG. 4A, which are not repeated hereinafter.

In the embodiment of FIG. 5A, the first common control circuit 560 includes the microcontroller 461 and an adjustment circuit 561. The adjustment circuit 561 is coupled to the feedback circuit 470 of the voltage source circuit 110. By changing the feedback information Vfb of the feedback circuit 470, the adjustment circuit 561 can make the voltage regulator circuit 110 correspondingly adjust the source voltage Vs. The microcontroller 461 is coupled to the adjustment circuit 561. The microcontroller 461 can control the adjustment circuit 561 according to the first voltage demand D1 and the second voltage demand D2 to make the adjustment circuit 561 change the feedback information Vfb of the feedback circuit 470. Accordingly, the voltage source circuit 110 can correspondingly adjust the source voltage Vs according to the feedback information Vfb.

Figure 5B:
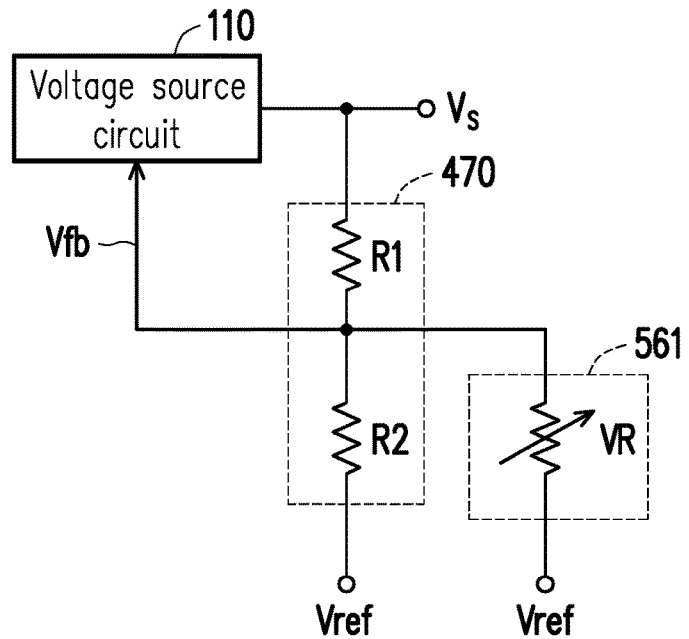
FIG. 5B is a circuit schematic diagram illustrating the feedback circuit and the adjustment circuit of FIG. 5A according to an embodiment of the invention.

For instance, FIG. 5B is a circuit schematic diagram illustrating the feedback circuit 470 and the adjustment circuit 561 of FIG. 5A according to an embodiment of the invention. As shown in FIG. 5B, the feedback circuit 470 of the voltage source circuit 110 includes the first resistor R1 and the second resistor R2. The first terminal of the first resistor R1 is coupled to the output terminal of the voltage source circuit 110 to receive the source voltage Vs. The second terminal of the first resistor R1 is coupled to the feedback terminal of the voltage source circuit 110 to provide the feedback information Vfb. The first terminal of the second transistor R2 is coupled to the second terminal of the first resistor R1. The second terminal of the second resistor R2 is coupled to the reference voltage Vref.

In the embodiment depicted in FIG. 5B, the adjustment circuit 561 includes a variable resistor VR. A first terminal of the variable resistor VR is coupled to the second terminal of the first resistor R1, and a second terminal of the variable resistor VR is coupled to the reference voltage Vref. The microcontroller 461 can change the feedback information Vfb by controlling/changing a resistance of the variable resistor VR. For example, the microcontroller 461 can change the feedback information Vfb by increasing (or decreasing) the resistance of the variable resistor VR. The voltage source circuit 110 can provide the source voltage Vs in different voltage levels according to the feedback information Vfb.

Figure 5C:
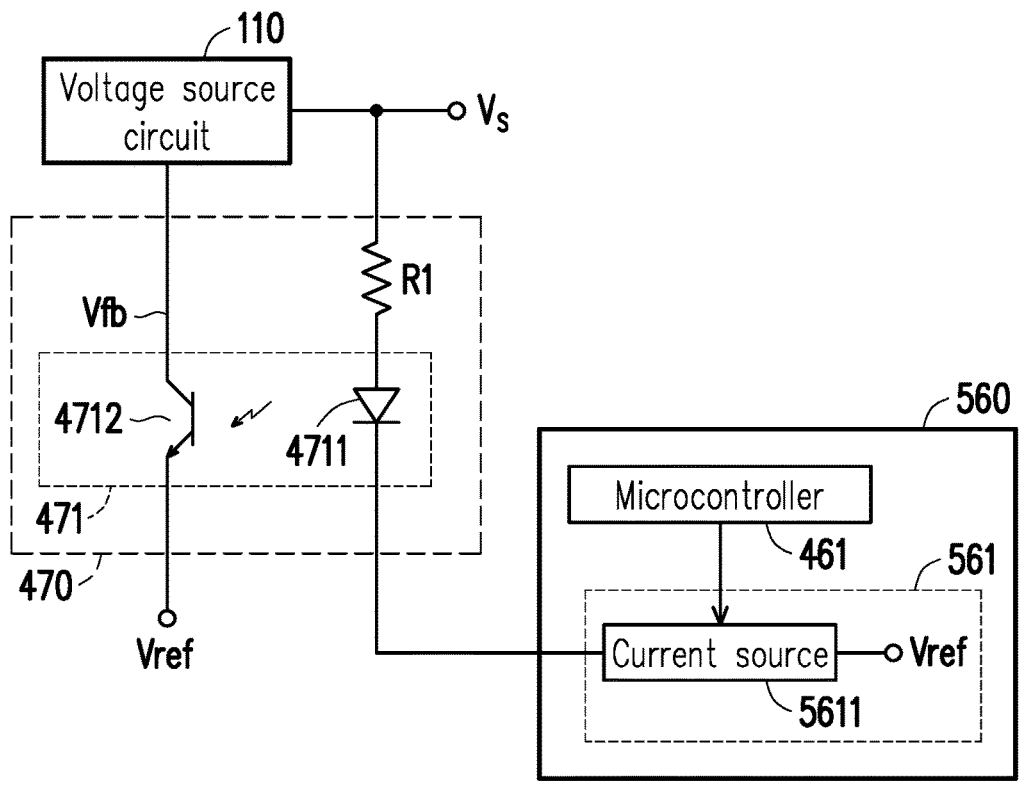
FIG. 5C is a circuit schematic diagram illustrating the feedback circuit and the adjustment circuit of FIG. 5A according to another embodiment of the invention.

FIG. 5C is a circuit schematic diagram illustrating the feedback circuit 470 and the adjustment circuit 561 of FIG. 5A according to another embodiment of the invention. As shown in FIG. 5C, the feedback circuit 470 of the voltage source circuit 110 includes the first resistor R1 and an optical coupler 471. The first terminal of the first resistor R1 is coupled to the output terminal of the voltage source circuit 110 to receive the source voltage Vs. The optical coupler has a light emitting part 4711 and a light receiving part 4712. For example, the light emitting part 4711 of the optical coupler 471 may be a light emitting diode, and the light receiving part 4712 of the optical coupler 471 may be an optical transistor. A first terminal of the light emitting part 4711 is coupled to the second terminal of the first resistor R1. A first terminal of the light receiving part 4712 is coupled to the feedback terminal of the voltage source circuit 110 to provide the feedback information Vfb. A second terminal of the light receiving part 4712 is coupled to the reference voltage Vref.

The adjustment circuit 561 includes a current source 5611. A first terminal of the current source 5611 is coupled to a second terminal of the light emitting part 4711, and a second terminal of the current source 5611 is coupled to the reference voltage Vref. A control terminal of the current source 5611 is coupled to the microcontroller 461. The microcontroller 461 can change the feedback information Vfb by changing a current value of the current source 5611 (i.e., an amount of the current flowing through the light emitting part 4711). The voltage source circuit 110 can correspondingly adjust the source voltage Vs according to the feedback information Vfb. For instance, the microcontroller 461 can change the current value of the current source 5611 according to the first voltage demand D1 and the second voltage demand D2 to thereby change the feedback information Vfb of the feedback circuit 470 so the voltage source circuit 110 can provide the source voltage Vs in different voltage levels according to the feedback information Vfb.

Figure 6:
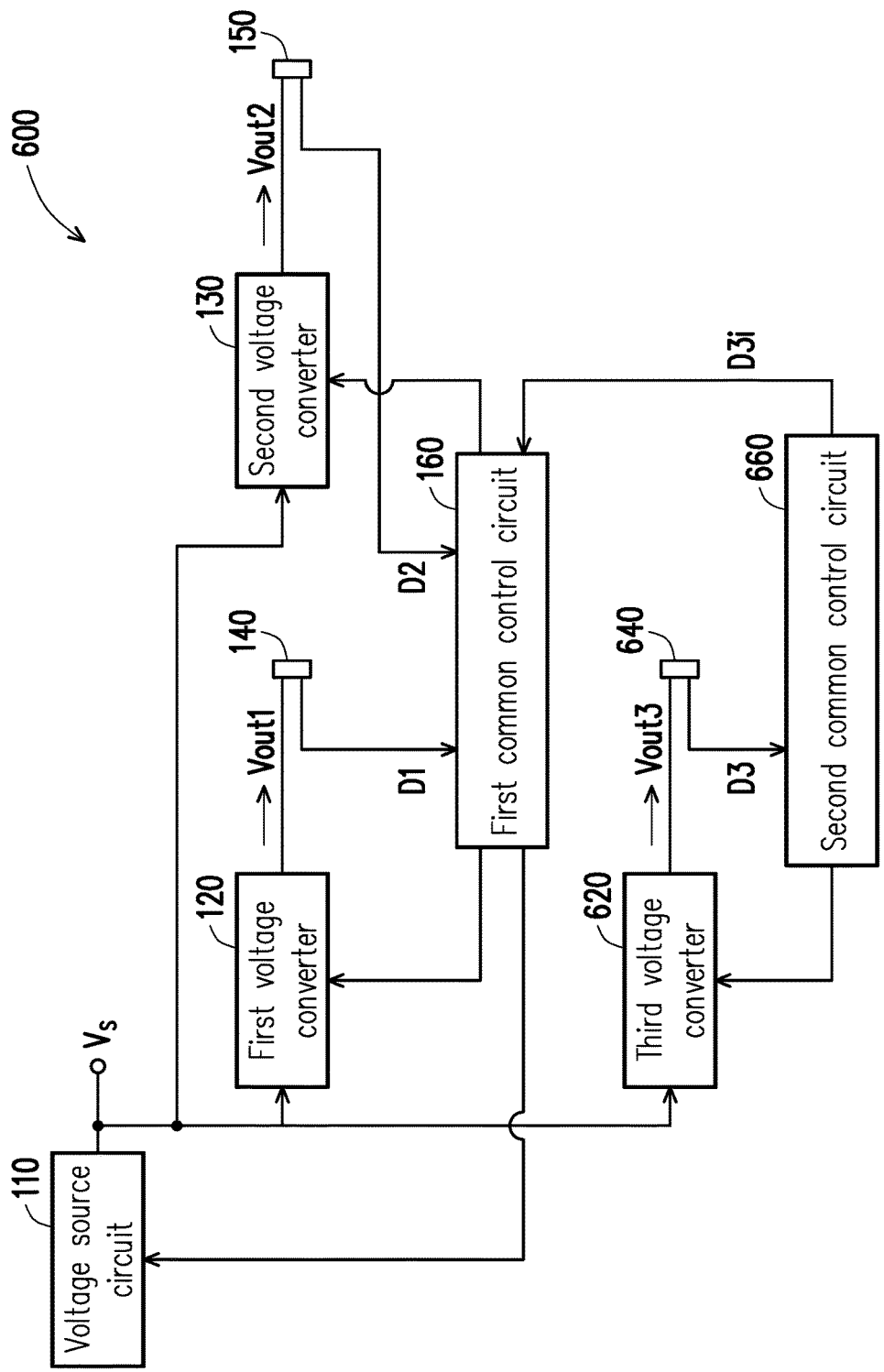
FIG. 6 is a circuit block diagram of a multi-port power supply apparatus according to still another embodiment of the invention.

FIG. 6 is a circuit block diagram of a multi-port power supply apparatus 600 according to still another embodiment of the invention. The multi-port power supply apparatus 600 of FIG. 6 includes the source voltage circuit 110, the first voltage converter 120, the second voltage converter 130, the first common control circuit 160, a third voltage converter 620 and a second common control circuit 660. The voltage source circuit 110, the first voltage converter 120, the second voltage converter 130 and the first common control circuit 160 depicted in FIG. 6 may refer to related descriptions for FIG. 1, which are not repeated hereinafter.

In the embodiment of FIG. 6, the multi-port power supply apparatus 600 can supply power to different external electronic apparatuses (not shown) through different connecting ports (e.g., the first connecting port 140, the second connecting port 150 and the third connecting port 640 depicted in FIG. 6). The number of the connecting ports and the number of the voltage converters in the multi-port power supply apparatus 600 depicted in FIG. 6 may be adjusted/set based on design requirements. Based on design requirements, the first connecting port 140, and/or the second connecting port 150 and/or the third connecting port 640 may be a USB connecting port or other connecting ports. The second common control circuit 660 is coupled to the third connecting port 640 to acquire a third voltage demand D3 of the third connecting port 640. For instance, in some embodiments, the second common control circuit 660 may be coupled to a CC pin of the third connecting port 640. The second common control circuit 660 conducts configuration information transmission with an external electronic apparatus (not shown) through the CC pin of the third connecting port 640 to acquire the voltage demand of the third connecting port 640 (i.e., a voltage demand of the external electronic apparatus). In some other embodiments, the second common control circuit 660 may be coupled to a power pin (the power bus pin) of the third connecting port 640 to measure a voltage of that power pin (a third output voltage Vout3), which is used as the voltage demand of the third connecting port 640.

The third voltage converter 620 is coupled to the voltage source 110 circuit to receive the source voltage Vs. The third voltage converter 620 can convert the source voltage Vs into the third output voltage Vout3 and output the third output voltage Vout3 to the third connecting port 640 of the multi-port power supply apparatus 600. For instance, the third voltage converter 620 can output the third output voltage Vout3 to the power pin (the power bus pin) of the third connecting port 640. The second common control circuit 660 can control the third voltage converter 620 according to the third voltage demand D3 of the third connecting port 640, so as to adjust the third output voltage Vout3. In this way, the multi-port power supply apparatus 600 can dynamically adjust the third output voltage Vout3 of the third connecting port 640 to satisfy the voltage demand of the third connecting port 640. Based on design requirements, the third voltage converter 620 may be a boost converter, a buck converter, a boost-buck converter or other voltage conversion circuits/devices.

With reference to FIG. 6, the second common control circuit 660 can further provide demand information D3i corresponding to the third voltage demand D3 to the first common control circuit 160. The first common control circuit 160 can correspondingly control the voltage source circuit 110 to dynamically adjust the source voltage Vs according to the first voltage demand D1, the second voltage demand D2 and the demand information D3i, so as to enhance the voltage conversion efficiency of the multi-port power supply apparatus 600.

For instance, in the case where each of the first voltage converter 120, the second voltage converter 130 and the third voltage converter 620 is the buck converter, the first common control circuit 160 can dynamically adjust the source voltage Vs to make the source voltage Vs close to a greatest one of the first output voltage Vout1, the second output voltage Vout2 and the third output voltage Vout3. It is assumed that the first voltage demand D1 of the first connecting port 140 indicates that the first output voltage Vout1 should be 20V, the second voltage demand D2 of the second connecting port 150 indicates that the second output voltage Vout2 should be 12V, and the third voltage demand D3 of the third voltage demand 640 indicates that the third output voltage Vout3 should be 5V. In this case, the first common control circuit 160 can control the voltage source circuit 110 to adjust the source voltage Vs to be a voltage close to the first output voltage Vout1 (i.e., 20V). For example, the source voltage Vs of the voltage source circuit 110 may be adjusted to 24V. Further, it is assumed that the first voltage demand D1 of the first connecting port 140 indicates that the first output voltage Vout1 should be 5V, the second voltage demand D2 of the second connecting port 150 indicates that the second output voltage Vout2 should be 5V, and the third voltage demand D3 of the third voltage demand 640 indicates that the third output voltage Vout3 should be 12V. In this case, the first common control circuit 160 can control the voltage source circuit 110 to adjust the source voltage Vs to be a voltage close to the third output voltage Vout3 (i.e., 12V). For example, the source voltage Vs may be adjusted to 15V. The first common control circuit 160 can make the source voltage Vs as close as possible to the greatest one of the first output voltage Vout1, the second output voltage Vout2 and the third output voltage Vout3 to reduce power conversion loss of the voltage converter to thereby enhance the voltage conversion efficiency of the multi-port power supply apparatus 600.

In summary, in the embodiments of the invention, the multi-port power supply apparatus can acquire the first voltage demand of the first connecting port and the second voltage demand of the second connecting port by the first common control circuit. The first common control circuit can dynamically adjust the source voltage provided by the voltage source circuit according to the first voltage demand and the second voltage demand. Thus, the voltage conversion efficiency of the multi-port power supply apparatus may be effectively enhanced.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A multi-port power supply apparatus, comprising:
   a voltage source circuit, providing a source voltage;
   a first voltage converter, coupled to the voltage source circuit to receive the source voltage, wherein the first voltage converter converts the source voltage into a first output voltage and outputs the first output voltage to a first connecting port of the multi-port power supply apparatus;

a second voltage converter, coupled to the voltage source circuit to receive the source voltage, wherein the second voltage converter converts the source voltage into a second output voltage and outputs the second output voltage to a second connecting port of the multi-port power supply apparatus; and a first common control circuit, coupled to the first connecting port to acquire a first voltage demand of the first connecting port, and coupled to the second connecting port to acquire a second voltage demand of the second connecting port, wherein the first common control circuit correspondingly controls the voltage source circuit to dynamically adjust the source voltage according to the first voltage demand and the second voltage demand, so as to enhance a voltage conversion efficiency of the multi-port power supply apparatus, wherein the first common control circuit comprises:
an adjustment circuit, coupled to a feedback circuit of the voltage source circuit, wherein the adjustment circuit is configured to change feedback information of the feedback circuit, and the voltage source circuit correspondingly adjusts the source voltage according to the feedback information; and a microcontroller, coupled to the adjustment circuit, wherein the microcontroller controls the adjustment circuit according to the first voltage demand and the second voltage demand so as to adjust the source voltage, wherein the feedback circuit of the voltage source circuit comprises:
a first resistor, wherein a first terminal of the first resistor is coupled to an output terminal of the voltage source circuit to receive the source voltage, and a second terminal of the first resistor is coupled to a feedback terminal of the voltage source circuit to provide the feedback information; and a second resistor, wherein a first terminal of the second resistor is coupled to the second terminal of the first resistor, and a second terminal of the second resistor is coupled to a reference voltage, wherein the adjustment circuit comprises a variable resistor, a first terminal of the variable resistor is coupled to the second terminal of the first resistor, a second terminal of the variable resistor is coupled to the reference voltage, and the microcontroller changes the feedback information by changing a resistance of the variable resistor.

2. The multi-port power supply apparatus according to claim 1, wherein the first common control circuit controls the first voltage converter to dynamically adjust the first output voltage according to the first voltage demand, and the first common control circuit controls the second voltage converter to dynamically adjust the second output voltage according to the second voltage demand.

3. The multi-port power supply apparatus according to claim 1, wherein the first voltage converter and the second voltage converter comprise a buck converter.

4. The multi-port power supply apparatus according to claim 1, wherein the first common control circuit makes the source voltage close to a greatest one of the first output voltage and the second output voltage.

5. The multi-port power supply apparatus according to claim 1, wherein the first connecting port and the second connecting port comprise a universal serial bus Type-C connecting port or a universal serial bus Type-A connecting port.

6. The multi-port power supply apparatus according to claim 1, further comprising:
a third voltage converter, coupled to the voltage source circuit to receive the source voltage, wherein the third voltage converter converts the source voltage into a third output voltage and outputs the third output voltage to a third connecting port of the multi-port power supply apparatus; and a second common control circuit, coupled to the third connecting port to acquire a third voltage demand of the third connecting port, wherein the second common control circuit provides demand information corresponding to the third voltage demand to the first common control circuit, and the first common control circuit correspondingly controls the voltage source circuit to dynamically adjust the source voltage according to the first voltage demand, the second voltage demand and the demand information, so as to enhance the voltage conversion efficiency of the multi-port power supply apparatus.

7. An operation method of a multi-port power supply apparatus, comprising:
providing a source voltage by a voltage source circuit;
converting the source voltage into a first output voltage and outputting the first output voltage to a first connecting port of the multi-port power supply apparatus by a first voltage converter;
converting the source voltage into a second output voltage and outputting the second output voltage to a second connecting port of the multi-port power supply apparatus by a second voltage converter;
acquiring a first voltage demand of the first connecting port and a second voltage demand of the second connecting port by a first common control circuit; and
correspondingly controlling the voltage source circuit to dynamically adjust the source voltage by the first common control circuit according to the first voltage demand and the second voltage demand, so as to enhance a voltage conversion efficiency of the multi-port power supply apparatus,
wherein the first common control circuit comprises a variable resistor and a microcontroller, and the step of dynamically adjusting the source voltage comprises:
changing a resistance of the variable resistor according to the first voltage demand and the second voltage demand by the microcontroller to change a feedback information provided to the voltage source circuit, and
correspondingly adjusts the source voltage according to the feedback information by the voltage source circuit.

8. The operation method according to claim 7, further comprising:
controlling the first voltage converter to dynamically adjust the first output voltage by the first common control circuit according to the first voltage demand; and
controlling the second voltage converter to dynamically adjust the second output voltage by the first common control circuit according to the second voltage demand.

9. The operating method according to claim 7, wherein the step of dynamically adjusting the source voltage further comprises:
making the source voltage close to a greatest one of the first output voltage and the second output voltage.

10. The operating method according to claim 7, wherein the first connecting port and the second connecting port comprise a universal serial bus Type-C connecting port or a universal serial bus Type-A connecting port.

11. The operation method according to claim 7, further comprising:
converting the source voltage into a third output voltage and outputting the third output voltage to a third connecting port of the multi-port power supply apparatus by a third voltage converter;
acquiring a third voltage demand of the third connecting port by a second common control circuit; and
providing demand information corresponding to the third voltage demand to the first common control circuit by the second common control circuit,
wherein the first common control circuit correspondingly controls the voltage source circuit to dynamically adjust the source voltage according to the first voltage demand, the second voltage demand and the demand information, so as to enhance the voltage conversion efficiency of the multi-port power supply apparatus.

12. A multi-port power supply apparatus, comprising:
a voltage source circuit, providing a source voltage;
a first voltage converter, coupled to the voltage source circuit to receive the source voltage, wherein the first voltage converter converts the source voltage into a first output voltage and outputs the first output voltage to a first connecting port of the multi-port power supply apparatus;
a second voltage converter, coupled to the voltage source circuit to receive the source voltage, wherein the second voltage converter converts the source voltage into a second output voltage and outputs the second output voltage to a second connecting port of the multi-port power supply apparatus; and
a first common control circuit, coupled to the first connecting port to acquire a first voltage demand of the first connecting port, and coupled to the second connecting port to acquire a second voltage demand of the second connecting port, wherein the first common control circuit correspondingly controls the voltage source circuit to dynamically adjust the source voltage according to the first voltage demand and the second voltage demand, so as to enhance a voltage conversion efficiency of the multi-port power supply apparatus,
wherein the first common control circuit comprises:
an adjustment circuit, coupled to a feedback circuit of the voltage source circuit, wherein the adjustment circuit is configured to change feedback information of the feedback circuit, and the voltage source circuit correspondingly adjusts the source voltage according to the feedback information; and
a microcontroller, coupled to the adjustment circuit, wherein the microcontroller controls the adjustment circuit according to the first voltage demand and the second voltage demand so as to adjust the source voltage,
wherein the feedback circuit of the voltage source circuit comprises:
a first resistor, wherein a first terminal of the first resistor is coupled to an output terminal of the voltage source circuit to receive the source voltage; and
an optical coupler, having a light emitting part and a light receiving part, wherein a first terminal of the light emitting part is coupled to a second terminal of the first resistor, a first terminal of the light receiving part is coupled to a feedback terminal of the voltage source circuit to provide the feedback information, and a second terminal of the light receiving part is coupled to a reference voltage,
wherein the adjustment circuit comprises a current source, a first terminal of the current source is coupled to a second terminal of the light emitting part, a second terminal of the current source is coupled to the reference voltage, a control terminal of the current source is coupled to the microcontroller, and the microcontroller changes the feedback information by changing a current value of the current source.

13. The multi-port power supply apparatus according to claim 12, wherein the first common control circuit controls the first voltage converter to dynamically adjust the first output voltage according to the first voltage demand, and the first common control circuit controls the second voltage converter to dynamically adjust the second output voltage according to the second voltage demand.

14. The multi-port power supply apparatus according to claim 12, wherein the first voltage converter and the second voltage converter comprise a buck converter.

15. The multi-port power supply apparatus according to claim 12, wherein the first common control circuit makes the source voltage close to a greatest one of the first output voltage and the second output voltage.

16. The multi-port power supply apparatus according to claim 12, wherein the first connecting port and the second connecting port comprise a universal serial bus Type-C connecting port or a universal serial bus Type-A connecting port.

17. The multi-port power supply apparatus according to claim 12, further comprising:
a third voltage converter, coupled to the voltage source circuit to receive the source voltage, wherein the third voltage converter converts the source voltage into a third output voltage and outputs the third output voltage to a third connecting port of the multi-port power supply apparatus; and
a second common control circuit, coupled to the third connecting port to acquire a third voltage demand of the third connecting port, wherein the second common control circuit provides demand information corresponding to the third voltage demand to the first common control circuit, and the first common control circuit correspondingly controls the voltage source circuit to dynamically adjust the source voltage according to the first voltage demand, the second voltage demand and the demand information, so as to enhance the voltage conversion efficiency of the multi-port power supply apparatus.

18. An operation method of a multi-port power supply apparatus, comprising:
providing a source voltage by a voltage source circuit;
converting the source voltage into a first output voltage and outputting the first output voltage to a first connecting port of the multi-port power supply apparatus by a first voltage converter;
converting the source voltage into a second output voltage and outputting the second output voltage to a second connecting port of the multi-port power supply apparatus by a second voltage converter;
acquiring a first voltage demand of the first connecting port and a second voltage demand of the second connecting port by a first common control circuit; and
correspondingly controlling the voltage source circuit to dynamically adjust the source voltage by the first common control circuit according to the first voltage demand and the second voltage demand, so as to enhance a voltage conversion efficiency of the multi-port power supply apparatus, wherein the first common control circuit comprises a current source and a microcontroller, and the step of dynamically adjusting the source voltage comprises:
changing a current value of the current source according to the first voltage demand and the second voltage demand by the microcontroller to change a feedback information provided to the voltage source circuit, and
correspondingly adjusts the source voltage according to the feedback information by the voltage source circuit.

19. The operation method according to claim 18, further comprising:
controlling the first voltage converter to dynamically adjust the first output voltage by the first common control circuit according to the first voltage demand; and
controlling the second voltage converter to dynamically adjust the second output voltage by the first common control circuit according to the second voltage demand.

20. The operating method according to claim 18, wherein the step of dynamically adjusting the source voltage further comprises:
making the source voltage close to a greatest one of the first output voltage and the second output voltage.

21. The operating method according to claim 18, wherein the first connecting port and the second connecting port comprise a universal serial bus Type-C connecting port or a universal serial bus Type-A connecting port.

22. The operation method according to claim 18, further comprising:
converting the source voltage into a third output voltage and outputting the third output voltage to a third connecting port of the multi-port power supply apparatus by a third voltage converter;
acquiring a third voltage demand of the third connecting port by a second common control circuit; and
providing demand information corresponding to the third voltage demand to the first common control circuit by the second common control circuit,
wherein the first common control circuit correspondingly controls the voltage source circuit to dynamically adjust the source voltage according to the first voltage demand, the second voltage demand and the demand information, so as to enhance the voltage conversion efficiency of the multi-port power supply apparatus.

* * * * *